United States Patent
Manavbasi (10) Patent No.: US 11,260,764 B2
(45) Date of Patent: Mar. 1, 2022

(54) PLUG DEVICE FOR A BATTERY, BATTERY AND VEHICLE

(71) Applicant: Volkswagen Aktiengesellschaft, Wolfsburg (DE)

(72) Inventor: Mahmut Manavbasi, Salzgitter (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 111 days.

(21) Appl. No.: 16/691,239

(22) Filed: Nov. 21, 2019

(65) Prior Publication Data
US 2020/0164756 A1    May 28, 2020

(30) Foreign Application Priority Data
Nov. 23, 2018 (DE) .................. 10 2018 220 184.6

(51) Int. Cl.
*B60L 53/16*   (2019.01)
*H01M 50/20*   (2021.01)

(52) U.S. Cl.
CPC .............. *B60L 53/16* (2019.02); *H01M 50/20* (2021.01)

(58) Field of Classification Search
CPC .............................. B60L 53/16; H01M 50/20
USPC ....................................................... 320/109
See application file for complete search history.

(56) References Cited

U.S. PATENT DOCUMENTS

| 10,340,644 | B1* | 7/2019 | Lee ................. H01R 13/5219 |
| 10,431,944 | B1* | 10/2019 | Su ..................... H01R 13/5202 |
| 10,553,987 | B2 | 2/2020 | Fehner | |
| 2002/0153866 | A1* | 10/2002 | Huang ..................... H02J 5/00 320/162 |

(Continued)

FOREIGN PATENT DOCUMENTS

| DE | 102016014766 A1 | 7/2017 | ............ H01M 2/06 |
| DE | 102017010389 A1 | 5/2018 | .......... H01M 10/655 |

(Continued)

OTHER PUBLICATIONS

German Office Action, Application No. 102018220184.6, 8 pages, dated Aug. 22, 2019.

(Continued)

*Primary Examiner* — Suresh Memula
(74) *Attorney, Agent, or Firm* — Slayden Grubert Beard PLLC (57) ABSTRACT

The invention relates to a plug device for a battery having a battery housing, in particular of an electrically driven vehicle, with a main connection body with at least two plug contours formed thereon which are each provided to receive a plug counter-contour of a plug element, with a number of power rails that are received into the main connection body and that each have at least two connection contacts, of which one connection contact is provided for the electrical connection within the housing to a battery connection and the other connection contact is seated in one of the plug contours for plug contacting on the outside of the housing with the assigned plug element, and with a sealing element for sealing the main connection body on the battery housing in a liquid- and gas-tight manner. Furthermore, the invention relates to a battery with such a plug device as well as a vehicle with such a battery.

18 Claims, 4 Drawing Sheets

(56) References Cited

U.S. PATENT DOCUMENTS

| | | | |
|---|---|---|---|
| 2010/0102775 A1* | 4/2010 | Chander | H02G 11/02 |
| | | | 320/109 |
| 2010/0225269 A1* | 9/2010 | Liu | H01M 10/44 |
| | | | 320/107 |
| 2010/0301810 A1* | 12/2010 | Biondo | H04Q 9/00 |
| | | | 320/155 |
| 2010/0320966 A1* | 12/2010 | Baxter | B60L 53/665 |
| | | | 320/109 |
| 2011/0070758 A1* | 3/2011 | Poulin | H01R 13/6275 |
| | | | 439/153 |
| 2018/0026248 A1* | 1/2018 | Fehner | H01R 13/405 |
| | | | 429/161 |

FOREIGN PATENT DOCUMENTS

| | | | | |
|---|---|---|---|---|
| EP | 2849259 A1 | 3/2015 | ............. | H01M 2/20 |
| WO | 2016/124298 A1 | 8/2016 | ............. | H01M 2/10 |

OTHER PUBLICATIONS

German Office Action, Application No. 102018220184.6, 5 pages, dated Apr. 15, 2020.
Extended European Search Report, Application No. 19207808.7, 7 pages, dated Apr. 20, 2020.

\* cited by examiner

PLUG DEVICE FOR A BATTERY, BATTERY AND VEHICLE

CROSS-REFERENCE TO RELATED APPLICATIONS

This application claims priority to German Patent Application No. DE 10 2018 220 184.6, filed on Nov. 23, 2018 with the German Patent and Trademark Office. The contents of the aforesaid Patent Application are incorporated herein for all purposes.

TECHNICAL FIELD

The invention relates to a plug device for a battery having a battery housing. Furthermore, the invention relates to a battery with such a plug device as well as an electrically driven vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

An electrically driven vehicle typically has a battery (traction battery) which supplies an electric motor with energy to drive the vehicle. In this case, an electrically driven vehicle is in particular an electric vehicle which stores the energy necessary for the drive only in the battery (BEV, battery electric vehicle), an electric vehicle with a range extender (REEV, ranged extended electric vehicle), a hybrid vehicle (HEV, hydric electric vehicle) and/or a plug-in hybrid vehicle (PHEV, plug-in hybrid electric vehicle).

Such a battery typically has a number of battery modules which are, for example, connected in series or parallel to each other. A voltage or current is provided to battery connections of battery modules connected in this manner to operate loads. Such loads are in particular a traction network for driving the vehicle or a secondary load such as, for example, an air-conditioning compressor.

The battery modules are introduced into a battery housing for their protection, in particular from weather and/or damage. Separate plug connections are provided on the battery housing, to which, for example, the respective loads arranged on the outside of the housing, a charging device for feeding a charging voltage or a charging current for charging the battery, are attached to establish an electrical connection to the battery connections. Furthermore, a plug connection for a pressure equalization device, for example, is arranged on the battery housing.

SUMMARY

An object of the invention is to provide a particularly suitable plug device. In some embodiments, mounting the plug connections on the battery housing should be as simple as possible, and/or the battery housing should be reliably sealed in a liquid- and/or gas-tight manner. Furthermore, a battery with such a plug device as well as a vehicle with such a battery should be provided in some embodiments.

The object is solved by the subject matter of the independent claims. Embodiments and developments are the subject matter of the dependent claims and the following description. The designs and embodiments, discussed in conjunction with a plug device also apply accordingly to a battery as well as to a vehicle and vice versa.

The details of one or more embodiments are set forth in the accompanying drawings and the description below. Other features will be apparent from the description, drawings, and from the claims.

DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In one aspect, a plug device for a battery having a battery housing is provided, which plug device comprises a main connection body having at least two plug contours formed thereon which are each provided to receive a plug counter-contour of a plug element; a number of power rails received in the main connection body, each having at least two connection contacts of which one connection contact is provided for the electrical connection within the housing to a battery connection and the other connection contact is seated in one of the plug contours for plug contacting on the outside of the housing with the assigned plug element; and a sealing element for sealing the main connection body on the battery housing in a liquid- and gas-tight manner.

The plug device in some embodiments is provided and suitable for a battery, such as one of an electrically driven vehicle, as well as, e.g., for mounting on a battery housing of the battery. The plug device according to the present aspect has a main connection body with at least two plug contours formed thereon. The main connection body may, e.g., be designed as a bar. The plug contours are each provided to receive a plug counter-contour of a plug element.

The plug contours in some embodiments are each designed as a collar which, when the plug device is mounted on the battery housing, rises from the main connection body on the outside of the battery housing. The plug contours, due to the formation of the main connection body, may, e.g., be monolithically, meaning integrally and contiguously, connected thereto. For example, the plug contour, in particular the collar, additionally may have coding contours for clear assignment of the respective plug elements, guides, retaining elements and/or clips or latching elements for the plug counter-contour of the respectively assigned plug element.

Furthermore, the plug device may have a number of power rails received in the main connection body, wherein the power rails each may have at least two connection contacts. Of these, one of the connection contacts may each be provided for the electrical connection within the housing to a battery connection. The other connection contact may be seated in one of the plug contours for (electrical) plug contacting with the assigned plug element on the outside of the housing.

Corresponding to the devices with which the plug elements assigned to the plug contacts are each coupled, an electrical connection to the respective battery connection could optionally be established in some embodiments. For such plug elements, the respective connection contact is seated in the assigned plug contour. For example, such a device may be a high-voltage load which uses an operating voltage of greater than or equal to 60 V, such as, for example, a traction network, or a (high-voltage) load such as, for example, an air-conditioning compressor. Alternatively, such a device is a charging device for charging the battery.

Correspondingly, for devices that are not to be electrically connected to the battery connection, no connection contact is provided in the respective plug contour. In particular, such devices are a pressure equalization device, a low-voltage load such as, for example, a controller, a sensor such as, for example, a temperature sensor, or a coolant feed or a coolant discharge.

In summary, a plug connection for the assigned plug element may be formed by means of the plug contour and optionally in corresponding embodiments in addition by means of the respective connection contact.

The plug device may also have a sealing element for sealing the main connection body on the battery housing in a liquid- and gas-tight manner. The sealing element may be arranged at least on the side of the main connection body facing away from the side having the plug contours, so that the sealing element in the mounted state is facing the battery housing.

The main connection body with the plug contours may for example be produced using an injection molding method. In some embodiments, the sealing element is an insert during injection molding of the main connection body. Alternatively, the sealing element and the main connection body in some embodiments may be produced using a two-component injection molding method. Further alternatively and in some embodiments, the sealing element is affixed to the main connection body, for example adhered, e.g., using adhesive. In any case, the sealing element is suitable for sealing the main connection body on the battery housing in a liquid- and gas-tight, in particular also dust-tight, manner.

Multiple, meaning at least two, plug connections may be integrated into a single main connection body due to the at least two plug contours being formed on the main connection body as well as the number of power rails being received in the main connection body. As a result, only this one main connection body is to be mounted on the battery housing, reducing the mounting effort in comparison to the separate mounting of the plug connections for the respective devices mentioned at the outset.

In the case of the separate design of the plug connections mentioned at the outset and in some embodiments, these may only be arranged relatively far apart from each other on the battery housing, for example due to respective fastening elements and/or due to a minimum distance between receivers of the battery housing for these fastening elements. In particular, the plug device may be more compact in comparison, so that the plug connections are arranged on the battery housing in a manner that conserves installation space. Further, only one single sealing elements may be necessary for the plug device, so that, in comparison to the separate design of the plug connections with one sealing element each, a particularly reliable and/or simple seal is realized.

In some embodiments, the number of power rails is at least two, wherein two of these power rails are referred to in the following as a first power rail and a second power rail. A first connection contact of the first power rail and a first connection contact of the second power rail are seated in a common first plug contour of the at least two plug contours. The first plug connection, which is formed by means of the first plug contour, the first connection contact of the first power rail, and the first connection contact of the second power rail, is designed, e.g., for a plug element of the battery-charging device or of the traction network. A second connection contact of the first power rail is provided for connecting to one first battery connection, e.g., one designed as a ground connection. A second connection contact of the second power rail is provided for connecting to one second battery connection, e.g., one designed as a phase connection.

For example, the second connection contacts may have an eyelet shape for a screw connection to an electrical conductor connected to the respective battery connection.

The plug device in some embodiments may have at least one such further plug connection, in the plug contour of which two first connection contacts of two further power rails are analogously seated.

In some embodiments, a first connection contact of a third power rail as well as a third connection contact of the first power rail are seated in a common second plug contour of the at least two plug contours. The second plug connection, which is formed by means of the second plug contour, the third connection contact of the first power rail, and the first connection contact of the third power rail, may be designed, for example, for a plug element of the secondary load. The second connection contact of the third power rail thereby may be designed for connecting to the second battery connection, which may be, e.g., designed in particular as a phase connection.

For example, further apparatuses such as, in particular, a safety device, a controller, and/or a voltage transformer may be connected between the battery connection and the respective second connection contact.

In summary, the first and the third connection contacts of the first power rail may be seated in the first plug contour and in the second plug contour respectively, wherein these connection contacts can be attached together to the first battery connection by means of the second connection contact of the first power rail. The first plug connection in some embodiments may be configured for the plug element of the traction network.

In some embodiments, the plug device has a third plug contour which is designed as a bayonet connection. The plug connection formed by means of the third plug contour is provided in particular for the pressure equalization device.

Beneficially, the bayonet connection may have a collar arranged on the circumference of a through opening for a gas.

In some embodiments, the plug device has a fourth plug contour designed in particular for low-voltage loads, meaning for loads that use operating voltage 12 V, 24 V, 36 V or 48 V. In this case, the fourth plug contour may be designed to receive plug elements on both sides. In other words, the fourth plug contour in the mounted state may be configured to receive both a plug element on the inside of the battery housing and another plug element corresponding to this plug element on the outside of the battery housing, which in the mounted state form a plug connection to each other. The fourth plug contour is designed for this purpose, e.g., as a collar arranged on the circumference of a connection opening of the main connection body, which opening connects the respective sides of the main connection body. The fourth plug contour may, for example, have latching or clip elements for securely holding the two plug elements. For example, a motor controller arranged on the outside of the battery housing as well as a battery controller arranged on the inside of the battery housing are connected to each other in this manner.

In some embodiments, the power rails that are provided for connecting to the first battery connection, which is designed for example as a ground connection, are joined to form a first rail group and are electrically insulated from each other. These power rails may in some embodiments be overmolded for this purpose in the course of the production of the plug device to form the first rail group. Analogously, the power rails that are provided for connecting to the second battery connection, which may be designed for example as a phase connection, are joined to form a second rail group and are electrically insulated from each other. These power rails may in some embodiments also be overmolded for this purpose. Beneficially, this may make separate insulation of the individual power rails unnecessary.

In the course of the production of the plug device, the first, e.g., overmolded, rail group and the second, e.g., overmolded, rail group are arranged on each other. The first rail group and the second rail group are hereby electrically insulated from each other due to being overmolded. In a further step during the production of the plug device, the rail groups arranged on each other are overmolded while forming the main connection body and the plug contacts.

The first rail group and the second rail group may therefore be designed as parts that are separate (modular) from each other before their overmolding. In this manner, the shape of each of the rail groups may be adapted to a position of the battery connections, independent of the shape of the respective other rail group, and in some embodiments also is adapted. For battery modules that differ from each other in the arrangement of their battery connections, an identical arrangement of the plug contours is enabled in this manner.

In some embodiments, all power rails are received in the main connection body in a form-fitting and/or bonded manner. For example, the power rails are overmolded for this purpose to form the main connection body including the plug contours. The power rails may in some embodiments be grouped first to form a first rail group and a separate second rail group as presented above and then overmolded. Alternatively, the power rails may, e.g., be overmolded directly while forming the main connection body.

In some embodiments, at least one of the plug contours, e.g., the plug contour or plug contours for the traction network or for the charging device, is tilted from a normal of the surface on which the plug contour is formed. In some embodiments, the respective connection contacts of the power rails are also correspondingly tilted. For example, the angle of the tilt from the normal is between 10° and 20°. Thus, a plug-in direction of the plug element into the corresponding plug connection is also tilted by this angle. As a result, connecting plug elements is simplified even with relatively little (installation) space being available for the connection, for example due to parts of the vehicle body running through the area of the plug device.

In some embodiments, a battery has a battery housing as well as a plug device designed according to one of the variations presented above. The plug connections may be liquid- and gas-tight only with a plugged-in plug element and/or with the use of a corresponding closure, for example a cap. However, the area in which the main connection body is arranged, e.g., fastened, on the battery housing is sealed in a liquid- and gas-tight manner by means of the sealing element.

In some embodiments, a vehicle has a battery in the variation presented above.

Further exemplary embodiments of the present aspect will be explained in more detail below with reference to the drawings.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Parts and quantities that correspond to each other are provided with the same reference signs in all FIGS.

Figure 1:
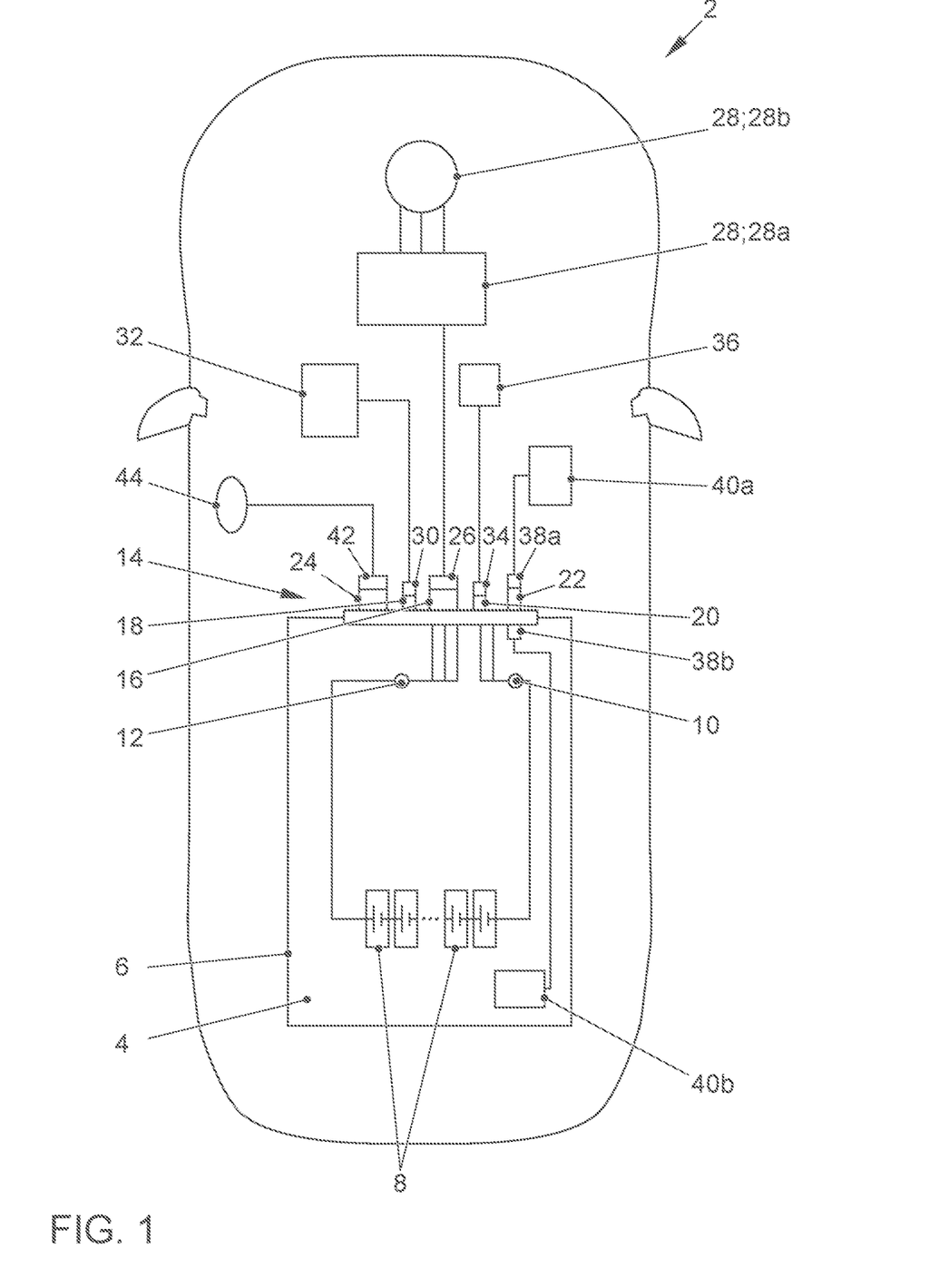
FIG. 1 shows a schematic top view of a vehicle with a battery which has a bar-like plug device.

FIG. 1 shows an electrically driven vehicle 2. It has a battery 4, in the battery housing 6 of which battery modules 8 that are connected to each other are received, by means of which a voltage or a current is provided to a first battery connection 10, which is designed as a ground connection, and to a second battery connection 12, which is designed as a phase connection. Furthermore, the battery 4 has a plug device 14 which is mounted on the battery housing 6. The plug device 14 forms an interface between devices arranged within the housing (on the housing's inner side) and devices arranged outside the housing (on the housing's outer side). For this purpose, the plug device 14 has five plug connections, namely a first plug connection 16, a second plug connection 18, a third plug connection 20, a fourth plug connection 22 and a fifth plug connection 24. These serve to connect a plug element 26 of a traction network 28 to an inverter 28a and to an electric motor 28b to drive the vehicle 2, a plug element 30 of a secondary load 32 designed as an air-conditioning compressor, a plug element 34 of a pressure equalization device 36 to change the pressure within the battery housing 6, two plug elements 38a and 38b of two low-voltage loads 40a and 40b respectively, which are designed as a motor controller and as a battery controller respectively, and a plug element 42 of a charging device 44 for the battery 4.

The plug device 14 is shown comparatively detailed in FIGS. 2a to 4b. The plug device 14 has a main connection body 46. A first plug contour 48, a second plug contour 50, a third plug contour 52, a fourth plug contour 54 as well as a fifth plug contour 56 are formed on a side of the main connection body 46, which is arranged on the battery housing 6 on the outside of the housing when the plug device 14 is mounted. These plug contours 48, 50, 52, 54, 56 each serve to receive a corresponding plug counter-contour 26a, 30a, 34a, 38c and 38d, and 42a respectively of each of the assigned plug elements 26, 30, 34, 38a and 38b, and 42 respectively.

Figure 2A:
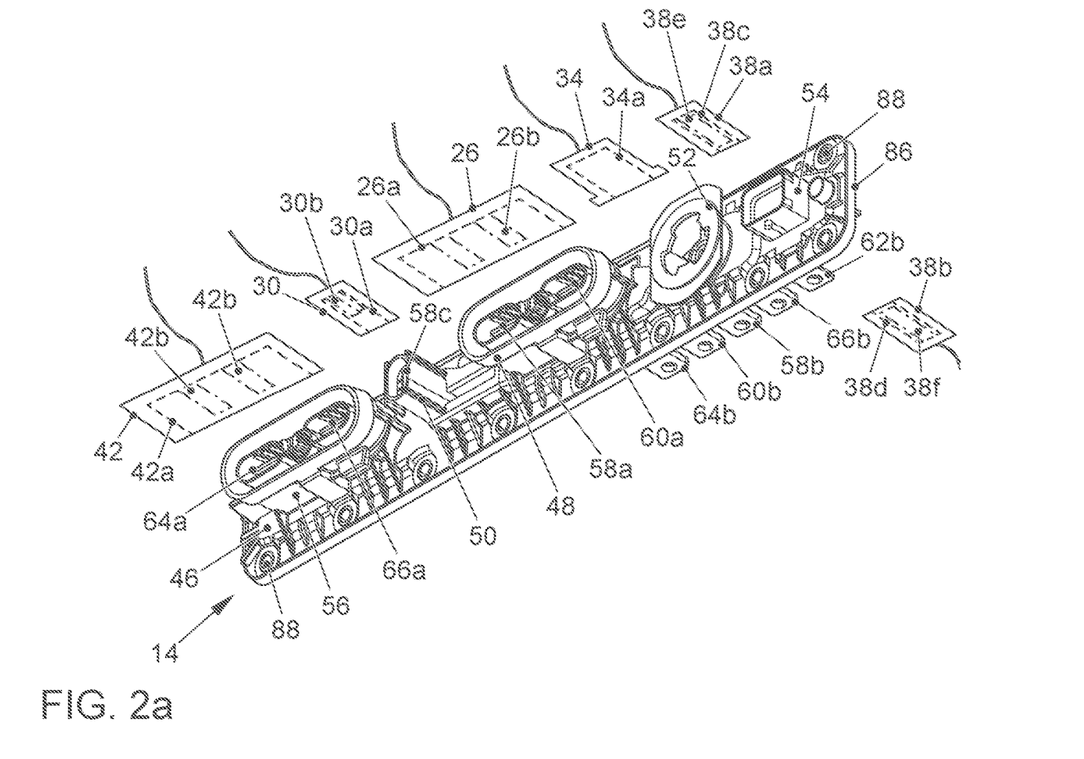
FIG. 2a shows a perspective view of a top view of the plug device with a main connection body, on which five plug contours are formed, wherein two connection contacts are seated in each of the three plug contours, as well as plug elements with plug counter-contours, wherein the plug contours are provided to receive the plug counter-contours.
Figure 3:
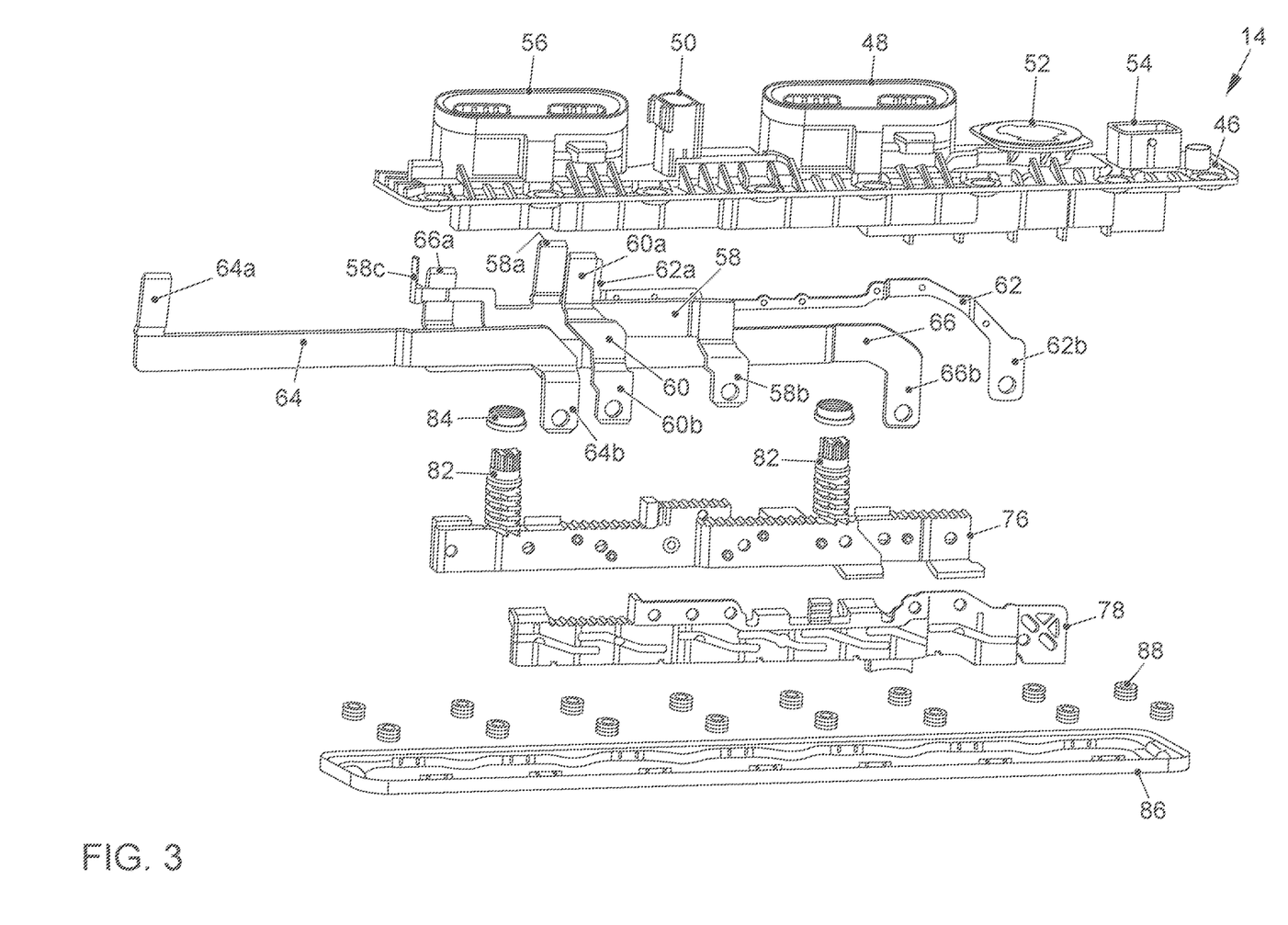
FIG. 3 shows a perspective explosion view of the plug device, wherein the plug device has a number of power rails which are received in the main connection body and have the connection contacts.

Furthermore, the plug device 14 has a first power rail 58, a second power rail 60, a third power rail 62, a fourth power rail 64 as well as a fifth power rail 66.

The first power rail 58 as well as the second power rail 60 each have a first connection contact 58a and 60a respectively, which are seated in the first plug contour 48 to form an (electrical) plug contact on the outside of the housing with the plug element 26 of the traction network 28. The first power rail 58 as well as the second power rail 60 also each have a second connection contact 58b and 60b respectively, wherein the second connection contact 58b of the first power rail 58 is provided for connecting within the housing to the first battery connection 10 and is also connected thereto. The second connection contact 60b of the second power rail 60 is hereby provided for connecting within the housing to the second battery connection 12 and is also connected thereto.

Both a first connection contact 62a of a third power rail 62 and a third connection contact 58c of the first power rail 58 are seated in the second plug contour 50. A second connection contact 62b of the third power rail 62 is hereby provided for connecting within the housing to the second battery connection and is also connected thereto.

In summary, the first connection contact 58a and the third connection contact 58c are seated in the first plug contour 48 and in the second plug contour 50 respectively. By means of the second connection contact 58b of the first power rail 58, both their first connection contact 58a and their third connection contact 58c are connected together to the first battery connection 10, so that a common electrical potential is applied on the first connection contact 58a and on the third connection contact 58c.

Furthermore, two first connection contacts 64a and 64b of a fourth power rail 64 and a fifth power rail 66 respectively are seated in the fifth plug contour 56. The fourth power rail 64 as well as the fifth power rail 66 each have a second connection contact 64b and 66b respectively, which are provided for connecting to the first battery connection 10 and to the second battery connection 12 respectively and are also connected thereto.

In this manner, an electrical connection between the battery connections 10, 12 and electrical contacts 26b, 30b, 42b of the plug elements 26, 30 and 42 respectively are realized by means of the power rails 58, 60, 62, 64, 66 when the plug elements 26, 30, 42 are connected.

The third plug contour 52 is designed as a bayonet connection, with which the plug element 34 of the pressure equalization device 36 can be coupled. The plug contour 52 designed as a collar thereby surrounds a through opening 68 for a gas.

The fourth plug contour 54 is designed as a collar, which is arranged on the circumference of a connection opening 70 of the main connection body 46, which opening connects the inside of the housing with the outside of the housing when the plug device 14 is mounted on the battery housing 6. Both the plug element 38b on the inside of the battery housing and the corresponding plug element 38a on the outside of the battery housing can be received in the fourth plug contour 54. As a result, the two plug elements 38a, 38b are in plug contact with each other in the received state. Thus, electrical contacts 38e, 38f of the plug elements 38a and 38b respectively are electrically connected to each other.

In summary, the first plug contour 48 and the connection contacts 58a, 60a seated therein form the first plug connection 16, the second plug contour 50 and the connection contacts 58c, 62a seated therein form the second plug connection 18, the fifth plug contour 56 with the connection contacts 64a, 66a seated therein form the fifth plug connection 24, the third plug contour 52 forms the third plug connection 20, and the fourth plug contour 54 forms the fourth plug connection 22.

Figure 2B:
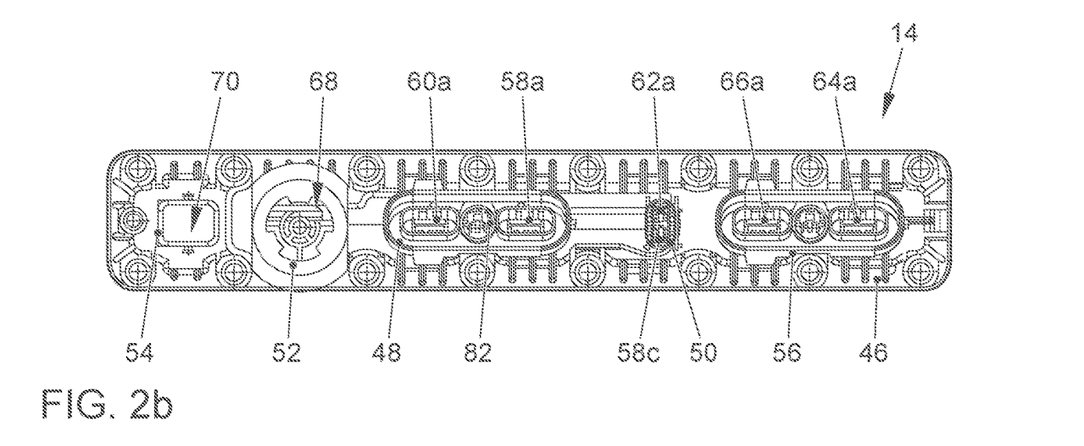
FIG. 2b shows a top view of the plug device.

As can be recognized in particular in FIG. 2b, the first plug connection 16 and the fifth plug connection 24 are tilted from a normal of the side of the main connection body 46 from which the respective plug contour 48 or 56 rises and on which these are formed.

The power rails 58, 60, 62, 64, 66 are essentially Z-shaped and arranged such that the connection contacts 58a, 58b, 58c, 60a, 60b, 62a, 62b, 64a, 64b, 66a, 66b run essentially parallel to each other. The section of the respective power rail 58, 60, 62, 64 or 66 connecting the first connection contacts 58a, 60a, 62a, 64a, 66a, and in the case of the first power rail 58 additionally the third connection contact 58c, to the second connection contacts 58b, 60b, 62b, 64b, 66b is referred to in the following as a connection section.

Figure 4A:
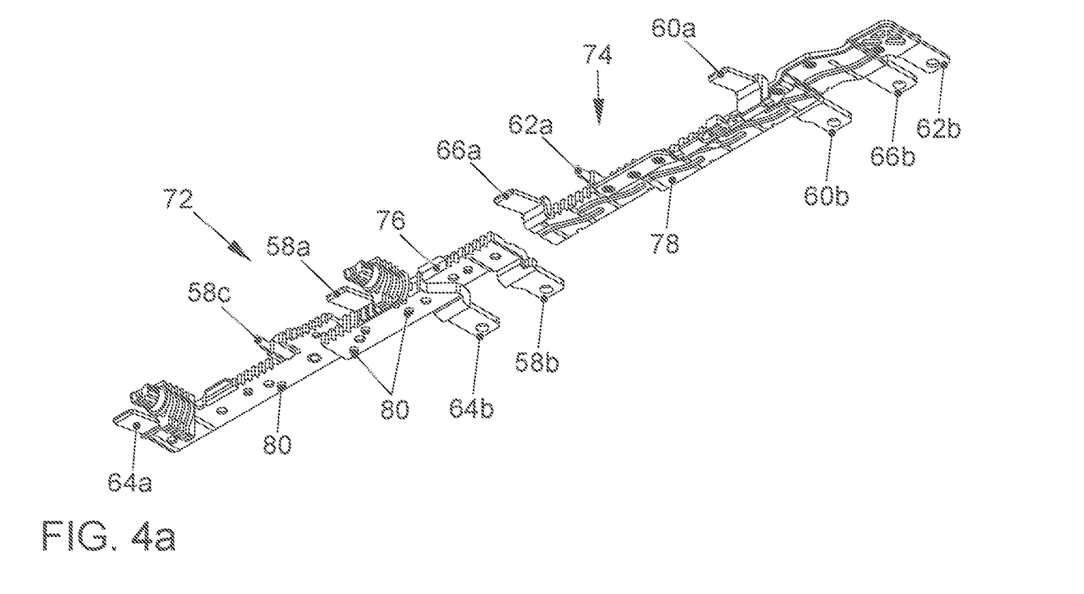
FIG. 4a shows a perspective view of a first rail group and a second rail group which has the power rails provided for connecting to a first and to a second battery connection respectively.
Figure 4B:
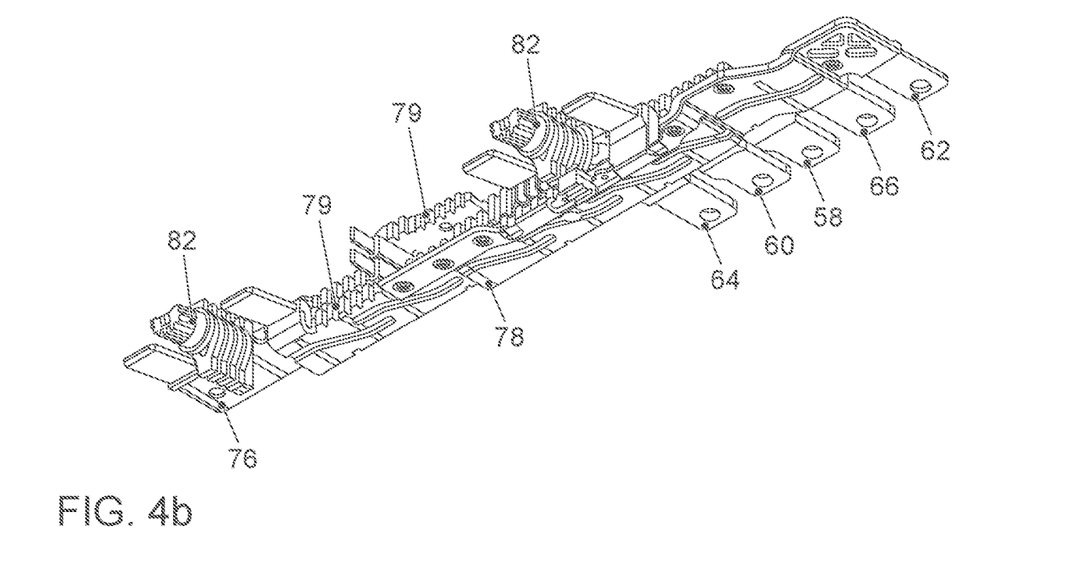
FIG. 4b shows a perspective view of the first rail group and the second rail group in the mounted state.

A first rail group 72 and a second rail group 74 are shown in FIGS. 4a and 4b. The first rail group 72 comprises the power rails 58, that are electrically connected to the first battery connection 10 in the mounted state. The second rail group 74 correspondingly comprises the power rails 60, 62, 66 that are electrically connected to the second battery connection 12 in the mounted state. The rail groups 72, 74 each have a plastic element 76 and 78 respectively, formed by overmolding the respective power rails in the area of their connection sections, by means of which the power rails 58, 64 and 60, 62, 66 respectively of the respective rail groups 72 and 74 respectively are electrically insulated from each other and are joined with each other.

The two plastic elements 76 and 78 hereby have a number of ribs 79 on their side facing the first connection contacts 58a, 60a, 62a, 64a, 66a to increase the (bending) stiffness of the rail group 72 and 74 respectively. Furthermore, a joining contour 80 designed as a stud is formed on the plastic element 76 of the first rail group 72 and is received in a corresponding receiving contour (not shown) of the plastic element 78 of the second rail group 74, so that the two plastic elements 76 and 78 are joined with each other in a form-fitting manner.

In addition, two studs 82 running parallel to the first connection contacts 64a, 58a are formed on the plastic element 76 of the first rail group 72, are seated in the first plug contour 48 and in the fifth plug contour 56 respectively and are each provided with a sealing ring 84.

The two rail groups 72 and 74 are received in the main connection body 46 in a form-fitting and bonded manner. For this purpose, the two rail groups 72 and 74 are overmolded in the course of the production of the plug device 14 while forming the main connection body 46.

The plug device 14 has a sealing element 86 designed as an insert for the overmolding of the two rail groups 72 and 74. By means of this sealing element, an (abutment) area in which the main connection body 46 is fastened to the battery housing 6 is sealed in a liquid- and gas-tight manner. In other words, a liquid- and gas-tight seal of the main connection body 46 on the battery housing 6 is realized. The sealing element 86 is thus arranged between the main connection body 46 and the battery housing 6.

Furthermore, a number of (screw) connectors 88 are introduced into the main connection body 46, by means of which this can be screw-mounted on the battery housing 6.

The invention has been described in the preceding using various exemplary embodiments. The invention is not limited to the exemplary embodiments described above. Other variations to the disclosed embodiments can be understood and effected by those skilled in the art without departing from the scope of the invention in practicing the claimed invention, from a study of the drawings, the disclosure, and the appended claims.

Further, in particular all individual features described in conjunction with the exemplary embodiments may also be combined with each other in other ways without departing from the scope of the invention.

In the claims, the words "comprising", "having", "with", without limitation, do not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

LIST OF REFERENCE NUMBERS

2 Vehicle
4 Battery
6 Battery housing
8 Battery module
10 Ground connection/first battery connection
12 Phase connection/second battery connection
14 Plug device
16 First plug connection
18 Second plug connection
20 Third plug connection
22 Fourth plug connection
24 Fifth plug connection
26 Plug element of the traction network
26a Plug counter-contour
26b Electrical contact
28 Traction network
28a Inverter
28b Electric motor
30 Plug element of the secondary load
30a Plug counter-contour
30b Electrical contact
32 Secondary load/air-conditioning compressor
34 Plug element of the pressure equalization device
34a Plug counter-contour
36 Pressure equalization device
38a Plug element of the motor controller
38b Plug element of the battery controller
38c Plug counter-contour
38d Plug counter-contour
38e Electrical contact
38f Electrical contact
40a Low-voltage load/motor controller
40b Low-voltage load/battery controller
42 Plug element of the charging device
42a Plug counter-contour
42b Electrical contact
44 Charging device
46 Main connection body
48 First plug contour
50 Second plug contour
52 Third plug contour
54 Fourth plug contour
56 Fifth plug contour
58 First power rail
58a First connection contact of the first power rail
58b Second connection contact of the first power rail
58c Third connection contact of the first power rail
60 Second power rail
60a First connection contact of the second power rail
60b Second connection contact of the second power rail
62 Third power rail
62a First connection contact of the third power rail
62b Second connection contact of the third power rail
62 Fourth power rail
64a First connection contact of the fourth power rail
64b Second connection contact of the fourth power rail
66 Fifth power rail
66a First connection contact of the fifth power rail
66b Second connection contact of the fifth power rail
68 Through opening
70 Connection opening
72 First rail group
74 Second rail group
76 Plastic element
78 Plastic element
79 Rib
80 Joining contour
82 Stud
84 Sealing ring
86 Sealing element
88 Connector

What is claimed is:

1. A plug device for attachment to a battery housing of a battery of an electric vehicle, the plug device comprising a main connection body, which main connection body having at least two plug contours formed integrally with the plug device, which are each provided to receive a plug counter-contour of a plug element; wherein
   a plurality of power rails are received in the main connection body, each having at least two connection contacts of which one connection contact is provided for the electrical connection within the battery housing to a battery connection and the other connection contact is seated in one of the plug contours for plug contacting on the outside of the housing with the assigned plug element; and
   comprising a sealing element for sealing the main connection body on the battery housing in a liquid- and gas-tight manner.

2. The plug device of claim 1, wherein a first connection contact of a first power rail and a first connection contact of a second power rail are seated in a first plug contour, wherein a second connection contact of the first power rail is provided for connecting to a first battery connection and a second connection contact of the second power rail is provided for connecting to a second battery connection.

3. The plug device of claim 2, wherein
   the connection contact of each power rail which is provided for connecting to the first battery connection are joined to form a first rail group and are electrically insulated from each other, and
   the connection contact of each power rail which is provided for connecting to the second battery connection are joined to form a second rail group separate from the first rail group and are electrically insulated from each other.

4. The plug device according to claim 2, wherein the first battery connection is configured as a ground connection.

5. The plug device according to claim 2, wherein the second battery connection configured as a phase connection.

6. The plug device of claim 2, further comprising a third plug contour, which is configured as a bayonet connection.

7. The plug device of claim 2, further comprising a fourth plug contour, which is arranged on the circumference of a connection opening of the main connection body for receiving within the housing and on the outside of the housing plug elements that can be plug-contacted with each other.

8. The plug device of claim 2, wherein a first connection contact of a third power rail and a third connection contact of the first power rail are seated in a second plug contour, wherein a second connection contact of the third power rail is provided for connecting to the second battery connection.

9. The plug device of claim 8, further comprising a third plug contour, which is configured as a bayonet connection.

10. The plug device of claim 8, further comprising a fourth plug contour, which is arranged on the circumference of a connection opening of the main connection body for receiving within the housing and on the outside of the housing plug elements that can be plug-contacted with each other.

11. The plug device of claim 1, further comprising a third plug contour, which is configured as a bayonet connection.

12. The plug device of claim 11, wherein the third plug contour is configured for a pressure equalization device.

13. The plug device of claim 11, further comprising a fourth plug contour, which is arranged on the circumference of a connection opening of the main connection body for receiving within the housing and on the outside of the housing plug elements that can be plug-contacted with each other.

14. The plug device of claim 1, further comprising a fourth plug contour, which is arranged on the circumference of a connection opening of the main connection body for receiving within the housing and on the outside of the housing plug elements that can be plug-contacted with each other.

15. The plug device of claim 1, wherein the power rails are received in the main connection body in one or more of a form-fitting and bonded manner.

16. The plug device of claim 1, wherein at least one of the plug contours is tilted from a normal of the surface on which this plug contour is formed.

17. A battery for an electric vehicle with a battery housing and with a plug device attached to the battery housing, the plug device comprising a main connection body, which main connection body having at least two plug contours formed integrally with the plug device, which are each provided to receive a plug counter-contour of a plug element; wherein a plurality of power rails are received in the main connection body, each having at least two connection contacts of which one connection contact is electrically connected within the battery housing to a battery connection of the battery and the other connection contact is seated in one of the plug contours for plug contacting on the outside of the housing with the assigned plug element; and comprising a sealing element for sealing the main connection body on the battery housing in a liquid- and gas-tight manner.

18. An electrically driven vehicle having a battery with a battery housing and with a plug device attached to the battery housing, the plug device comprising a main connection body which main connection body having at least two plug contours formed integrally with the plug device, which are each provided to receive a plug counter-contour of a plug element; wherein a plurality of power rails are received in the main connection body, each having at least two connection contacts of which one connection contact is electrically connected within the battery housing to a battery connection of the battery and the other connection contact is seated in one of the plug contours for plug contacting on the outside of the housing with the assigned plug element; and comprising a sealing element for sealing the main connection body on the battery housing in a liquid- and gas-tight manner.

* * * * *